(12) United States Patent
Perdue et al.

(10) Patent No.: US 6,799,124 B2
(45) Date of Patent: Sep. 28, 2004

(54) METHOD OF OPTIMIZING RISK INFORMED INSPECTIONS OF HEAT EXCHANGERS

(75) Inventors: Robert K. Perdue, Murrysville, PA (US); Kenneth R. Balkey, Pittsburgh, PA (US); Philip J. Kotwicki, Pittsburgh, PA (US); Robert F. Keating, Trafford, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 63 days.

(21) Appl. No.: 10/011,454

(22) Filed: Nov. 29, 2001

(65) Prior Publication Data

US 2003/0065454 A1 Apr. 3, 2003

Related U.S. Application Data

(60) Provisional application No. 60/256,124, filed on Dec. 15, 2000.

(51) Int. Cl.[7] .............................. G01B 3/44; G01B 3/52; G06F 19/00
(52) U.S. Cl. ........................... 702/34; 702/39; 73/61.62; 73/596; 165/112; 118/725; 141/263; 141/264; 435/2
(58) Field of Search ................... 702/34, 39; 165/112; 324/220; 118/725; 141/263–264; 435/2; 73/61.62, 596

(56) References Cited

U.S. PATENT DOCUMENTS 5,025,854 A * 6/1991 Richter et al. ............... 165/112
5,105,876 A    4/1992 Burack et al.
5,442,284 A * 8/1995 Kolditz ....................... 324/220

FOREIGN PATENT DOCUMENTS

| DK | 26 51 940 A1 | * 11/1976 | ............. F28D/7/10 |
| JP | 358045498 A | * 3/1983 | ............. F28F/11/00 |

OTHER PUBLICATIONS

U.S. Nuclear Regulatory Commission, An Approach for Using Probabilistic Risk Assessment in Risk–Informed Decisions on Plant–Specific Changes to the Licensing Basis, Jul. 1998, Regulatory Guide 1.174.

Nuclear Energy Institute, Steam Generator Program Guidelines, Apr. 2000, p. 11, NEI 97–06.

NDE/ISI Issue Resolution Group, PWR Steam Generator Examination Guidelines: Revision 5, Sep. 1997, p. 3–8 & 3–9, EPRI TR–107569–V1R5.

M. Merilo, Steam Generator Integrity Assessment Guidelines: Revision 1, Mar. 2000, pp. 8–1, 9–5, A–6 & A–7, TR–107621–R1.

J. Benson, Risk Informed Inspection for Steam Generators, Feb. 2000, pp. 4–1 to 4–7 & 7–1, TR–114736–V1.

(List continued on next page.)

Primary Examiner—John Barlow
Assistant Examiner—Aditya S Bhat (57) ABSTRACT

A probabilistic method for optimizing the inspection of a heat exchanger that determines the maximum number of degraded tubes that can be permitted to remain in service for a contemplated interval of time without exceeding an allowable probability of a tube burst, based upon Extreme Value Probability Distribution theory. The method also determines the minimum number of tubes that need to be inspected to establish that no more than the determined maximum number of degraded tubes will be permitted to remain in service for the contemplated interval of time based upon Bayesian Acceptance Sampling Theory.

16 Claims, 4 Drawing Sheets

OTHER PUBLICATIONS

B. Keating, SLB Leak Rate and Tube Burst Probability Analysis Methods for ODSCC at TSP Intersections, Jan. 1995, p. 2–1, Westinghouse Electric Corporation Nuclear Services Division.

El Murphy, Steam Generator Tube Integrity, Dec. 1998, p. 18 & 19, Draft Regulatory Guide DG–1074, U.S. Nuclear Regulatory Commission Office of Nuclear Regulatory Research.

KC Kapur et al., Reliability in Engineering Design, pp. 44 & 409.

Lee J Bain, Statistical Analysis of Reliability and Life–Testing Models, pp. 352, 398–399, 431–432, vol. 24.

Robert K Perdue, A Spreadsheet Model for the Evaluation of Statistical Confidence in Nuclear Inservice Inspection Plans, Feb. 10, 1998, Westinghouse Electric Company, Pittsburgh, PA.

GJ Lieberman et al., Tables of the Hypergeometric Probability Distribution, 1961, pp. 17–18, Stanford University Press, Stanford, California.

U.S.Nuclear Regulatory Commission, Technical Elements of Risk–Informed Inservice Inspection Programs for Piping, pp. 5–2 to 5–8, NUREG–1661.

* cited by examiner

METHOD OF OPTIMIZING RISK INFORMED INSPECTIONS OF HEAT EXCHANGERS

CROSS-REFERENCE TO RELATED APPLICATION

This Application claims the benefit, under 35 U.S.C. 119(e), of Provisional Application Serial No. 60/256,124 filed on Dec. 15, 2000.

BACKGROUND OF THE INVENTION

1. Field of the Invention

This invention pertains generally to a method of optimizing the scheduling of inspections of heat exchanger tubes and minimizing the number of tubes to be sampled as part of that inspection, and more particularly, to the optimization of the inspection of second generation nuclear powered steam generators in a risk informed manner.

2. Related Art

Steam generators in nuclear power reactor systems have a primary side through which the reactor coolant is circulated and a secondary side in heat exchange relationship with the primary side. The reactor coolant enters an inlet plenum and is circulated through tubes to an outlet plenum where it is returned to the reactor. The secondary side includes a water reservoir that surrounds the tubes that is fed by a feedwater inlet. The heat from the primary side converts the water on the secondary side to steam, which is used to drive a turbine that in turn powers a generator to create electricity. The tubes through which the primary coolant passes shield much of the radioactivity carried by the coolant, from the secondary side. The number of such tubes in a typical power plant steam generator can number in the order of thousands. Tube integrity is a safety concern and is therefore monitored. Tube degradation can arise from a number of causes, e.g., corrosion, vibration, etc. Therefore, it has been the practice to periodically inspect the tubes, so that tubes exhibiting a defined degree of degradation can be identified and repaired before being placed back in service. Because of the number of tubes and the environment in which they have to be inspected, the inspection process can be extremely costly.

Second generation nuclear steam generators have been designed to be less susceptible to various modes of tube degradation than their first generation counterparts. Second generation steam generators are found both as original equipment on newer power plants and as replacements for first generation units. The increased resistance of the new generation of steam generators to tube corrosion offers the opportunity for nuclear utilities to consider reducing the frequency and, possibly, the number of tubes inspected. Because steam generator tubing is "safety significant" in the sense that challenges to tubing integrity can affect the probability of core damage in the unlikely event of certain postulated accidents, the reduction of inspection sampling currently common for first generation steam generators must be art done in a manner that engenders a high degree of confidence that safety will not be compromised.

A "risk-informed" approach offers one potential avenue for reducing the frequency and amount of inservice inspection of second-generation steam generator tubing. The United States Nuclear Regulatory Commission, which has regulatory authority over the subject issue, is committed to a risk-informed approach to reducing the operational costs of achieving acceptable safety levels, e.g., RG 1.174, U.S. Nuclear Regulatory Commission, "An Approach Using Probabilistic Risk Assessment in Risk-Informed Decisions On Plant-Specific Changes To The Licensing Basis," July 1998. Essentially, the risk-informed approach supplants or augments, usually the latter, traditional deterministic engineering design and structural analysis methods with probabilistic methods. Because risks are explicitly evaluated, there is less need to incorporate conservatism and the result can be a significant reduction in safety-related inspection or testing without impairing safety. In the present case, there is a reason to believe that much of the safety-related inspection thought necessary for first generation tubing is an unnecessary expense for second generation tubing. Risk-informed methods can potentially be applied to determine just how far a specific nuclear plant can go in reducing these costly inspections while maintaining or, possibly enhancing, acceptable safety.

Current steam generator tube integrity guidelines, NEI 97-06, Revision 1B (Draft), "Steam Generator Program Guidelines," Nuclear Energy Institute, Washington, D.C. (April 2000) and EPRI TR-107621-R1, Electric Power Research Institute, "Steam Generator Integrity Assessment Guidelines: Revision 1", March 2000, call for performing a condition monitoring evaluation at each steam generator inspection. This is described as a backward-looking analysis of the inspection results. The primary objective of the condition monitoring analysis is to establish that the most limiting inspected steam generator tubes do not violate a structural limit based on ". . . a minimum burst pressure of 3 times the normal operating pressure" that is determined through engineering analysis. Tangible outputs of the condition monitoring analysis include the aforementioned structural limit expressed as a fraction or percent of the tube wall thickness and, typically, a set of statistics—the mean and standard deviation—on the "throughwall" growth rates per effective full power year (EFPY)," and a frequency distribution on the depths of all indications found. EFPY is the time period over which the steam generator saw service that equals the amount of full service the steam generator would have experienced if it was operated continuously over a full year.

Sampling protocols for inspections differ substantially in practice but the Electric Power Research Institute (EPRI) Pressurized Water Reactor Steam Generator Inspection Guidelines, EPRI TR-107569-VIR5, Electric Power Research Institute (EPRI), "PWR Steam Generator Examination Guidelines," Rev 5, Vol. 1, September 1997, can be taken as representative of the current state of the art. The EPRI inspection guidelines recommend a "triple sample plan," which to the extent pertinent, can be summarized as follows:

(1) Take a sample of 20% of the tubes in a steam generator and inspect for degraded tubes, where the latter are tubes where the maximum indication of a degradation falls between some minimum threshold depth, nominally 20%, and the maximum depth beyond which the tube must be repaired, nominally 40%. A degradation beyond 40% of the tube's through-wall thickness is required to be repaired before the tube can placed back in service.

(2) "Accept", i.e., stop sampling, the tubes if the fraction of tubes found to be degraded falls below a minimum criterion of 5%. If the fraction found degraded falls between the minimum and maximum criteria, i.e., 5%–10%, then take a second sample of 20% of the tubes. "Reject" the steam generator tubes, i.e., sample 100% the steam generator tubes, if the fraction of the sample found to be degraded exceeds a maximum criterion of 10% of the tubes.

(3) Cumulate the fraction found degraded in the first and second samples and utilize the same minimum and maximum criterion and decision rule on the second sample. If the cumulative degraded number of tubes fall between minimum and maximum criterion, then take a third and final sample of an additional 20% of the tubes.

(4) If the cumulative fraction degraded is less than or equal to five percent of the total tubes sampled, then accept the inspection as being complete. Otherwise, inspect all the remaining tubes of that steam generator. Further, if at anytime the steam generator's tube lot, i.e., all the tubes in the steam generator that are inspected, is rejected, open another steam generator not originally scheduled for inspection and repeat the above sampling plan on this additional steam generator.

In a typical four-loop plant, i.e., a plant with four steam generators, two steam generators come up for inspection every refueling outage, for example, approximately every 18 months.

The steam generator integrity assessment guidelines, cited above, also call for an "operational assessment," described as a forward-looking analysis whose primary objective is to determine that the aforementioned structural limit will not be exceeded before the next scheduled inspection. The recommended approach of the EPRI Risk Informed Inspection document, EPRI TR-114736-V1, Electric Power Research Institute, "Risk Informed Inspection for Steam Generators," Vol. 1, February, 2000, is to take into account all of the uncertainties in the dispersion of indication depths and measurement errors, and also account for the outer extremes of measured growth rates in indications, i.e., degradations. In essence, this amounts to showing:

1. that the application of the $95^{th}$ percentile crack growth rate, i.e., the crack growth rate at which 95% of the growth cracks grow at or below, to the largest crack left in service (measured in a most conservative way to incorporate safety margins for analytical and measurement error) will still not produce a crack that will exceed a structurally limiting value before the next contemplated inspection, or equivalently, 2. that the time to exceeding the structurally limiting value (referred to more precisely as an "operational assessment" limit) will be greater than the margin between the structurally limiting and the worst degraded tube left in service divided by the highest plausible crack growth rate.

The term "structural limit" is not used in the preceding description because it has a specific meaning in the nuclear industry with respect to the integrity of steam generator tubes. It is the measured degradation value, e.g., depth, which meets regulatory structural integrity criteria based on using a mean relationship between the burst pressure and the measured parameter, mean material properties, and assuming no uncertainty in the measurement of the structural parameter.

Neither the steam generator tube integrity guidelines, identified previously, nor practice rules out the more probabilistic approach to defining a steam generator tube inspection plan. Specific applications of probabilistic analyses exist for specific modes of degradation. For example, Keating, R. F., Westinghouse report (WCAP14277), "SLB Leak Rate and Tube Burst Probability and Analysis Methods for ODSCC at TSP Intersections," January 1995, uses probabilistic methods to project leak rates and tube burst probabilities for tubes with outer diameter stress corrosion cracking at tube support plates. Further, the Nuclear Regulatory Commission has published draft guidelines, DG-1074, US Nuclear Regulatory Commission, "Steam Generator Tube Integrity (Draft Guide)", December 1998, with explicit probability targets for burst rates. Current practice, however, is fundamentally deterministic and does not employ any probabilistic methods to consider the likelihood of achieving safety targets for stipulated intervals between inspections. The current methods that are employed instead rely on traditional deterministic conservative safety margins. In fact, it may not always be conservative. The practice of assuming that the largest crack will necessarily fail first is questionable, particularly when a large number of tubes have indications of degradation that are just slightly below the limiting tube indication. A probabilistic approach can improve safety or at least increase confidence while providing economic savings by establishing a defensible probabilistic case for reducing the frequency and extent of inspections for second generation steam generators.

Further, the current recommended sampling plan may or may not provide sufficient confidence for a specific plant. The plan is not tied to a specific plant reliability target and not integrated with the results of the condition monitoring activity. It is well-known from acceptance sampling literature that any number of combinations of sample sizes and acceptance criteria (as well as other aspects of a sample plan) may achieve the same reliability at the same confidence and hence, there can exist significant savings from tailoring sampling plans for particular plants that have smaller expected sampling requirements and/or less risk of having to extend an outage by opening a new steam generator to inspection.

Accordingly, it is an object of this invention to provide an improved steam generator inspection plan that provides an economic optimization of scheduled inspections consistent with regulatory reliability targets. It is a further object of this invention, as part of the economic optimization of scheduled inspections, to determine the maximum number of degraded tubes to be left in service and still achieve the reliability targets. Still another object of this invention is to identify the minimum number of tubes to be inspected that are required to demonstrate a stipulated confidence in not exceeding the aforementioned maximum number of degraded tubes that are to be left in service.

SUMMARY OF THE INVENTION

These and other objects of this invention are achieved by a method for optimizing the inspection of a heat exchanger including the steps of (a) inspecting a number of tubes in a bundle of the heat exchanger for indications of degradation; and (b) determining the maximum time of service between tube inspections the heat exchanger can operate consistent with the number of degraded tubes left unrepaired at a last inspection, employing a probabilistic algorithm. In the preferred embodiment, the probabilistic algorithm is based upon the extreme value probability distribution theory. In an additional embodiment, the method of this invention determines the minimum number of tubes that need to be inspected to establish that no more than the determined maximum number of degraded tubes will be permitted to remain in service for the contemplated interval of time, employing probabilistic theorems. In the method of this invention, the contemplated interval of time can be a variable selected to minimize the frequency of inspection of the heat exchanger. In the preferred embodiment, the probabilistic theorem employed to determine the minimum number of tubes that need to be inspected is a Bayesian Acceptance Sampling algorithm. In addition, the determining step preferably takes into account the probability of detection of a given one of the degraded tubes.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The method of this invention is designed to provide theoretically-rigorous, computationally practical risk-informed support for: (a) the extension of steam generator inspection intervals, and (b) the economic optimization of scheduled inspections, all subject to achieving the Nuclear Regulatory Commission's reliability targets at traditionally prescribed levels of confidence. Further, the model employed to carry out the invention uses the same engineering analysis and the same essential data currently collected at inspections. In the preferred embodiment, the model for carrying out the steps of this invention has 2 modules: (1) an Allowable Indications Module; and (2) a Sampling Module.

The Allowable Indications Module utilizes the extreme value probability distribution theory to produce an estimate of the maximum number of degraded tubes that can be left in service for a contemplated interval, e.g., EFPY, before the next inspection, while still satisfying regulatory guidelines for probability of a tube burst. The Module can also be used to determine the maximum EFPY before the next inspection for a given number of indications. Particularly, for anti-vibration bar (AVB) wear, there is a clear advantage over current practice. As noted above, the current method assumes a single limiting tube will always win the race to the structural limit. The model employed by this invention, by contrast, allows all tubes to enter the race. Further, the current practice does not factor in the maximum allowable burst probability addressed by the NRC in DG-1074, US Nuclear Regulatory Commission, "Steam Generator Tube Integrity (Draft Guide)", December 1998. This invention does take into account the maximum allowable burst probability.

The Sampling Module solves for a sample plan that minimizes "Average Total Inspection" subject to achieving a desired confidence, e.g., 95%, that the allowable indications determined in the Allowable Indications Module will not be exceeded. This Module also produces projections of Average Tubes Repaired and the "Risk of having to Open Another Steam Generator." The Sampling Module has two main features:

(a) A Bayesian perspective on a traditional acceptance sampling concept of "consumer risk" yields a unique model that incorporates not only the sample itself, but information from prior samples into an estimated post-inspection probability distribution on the number of degraded tubes left in the steam generator.

(b) A mathematical programming perspective on inspection optimization that provides what current practice cannot; namely, the demonstrated assurance of the minimum possible, expected number of tubes sampled to achieve a stipulated reliability at a stipulated level of confidence.

The two modules offer a commercial nuclear power plant potential economic benefits arising from:

(1) an improved case for extended inspection intervals for individual steam generator units;

(2) reduced inspection costs;

(3) reduced chance of having to extend an outage because of the need to open an unscheduled unit; and (4) a direct application of the regulatory probabilistic reliability guidelines and the actions taken to risk-inform steam generator tube inspections.

The latter enhances the chances of getting the maximum benefits approved by the regulatory authorities.

Allowable Indications Module

Figure 1:
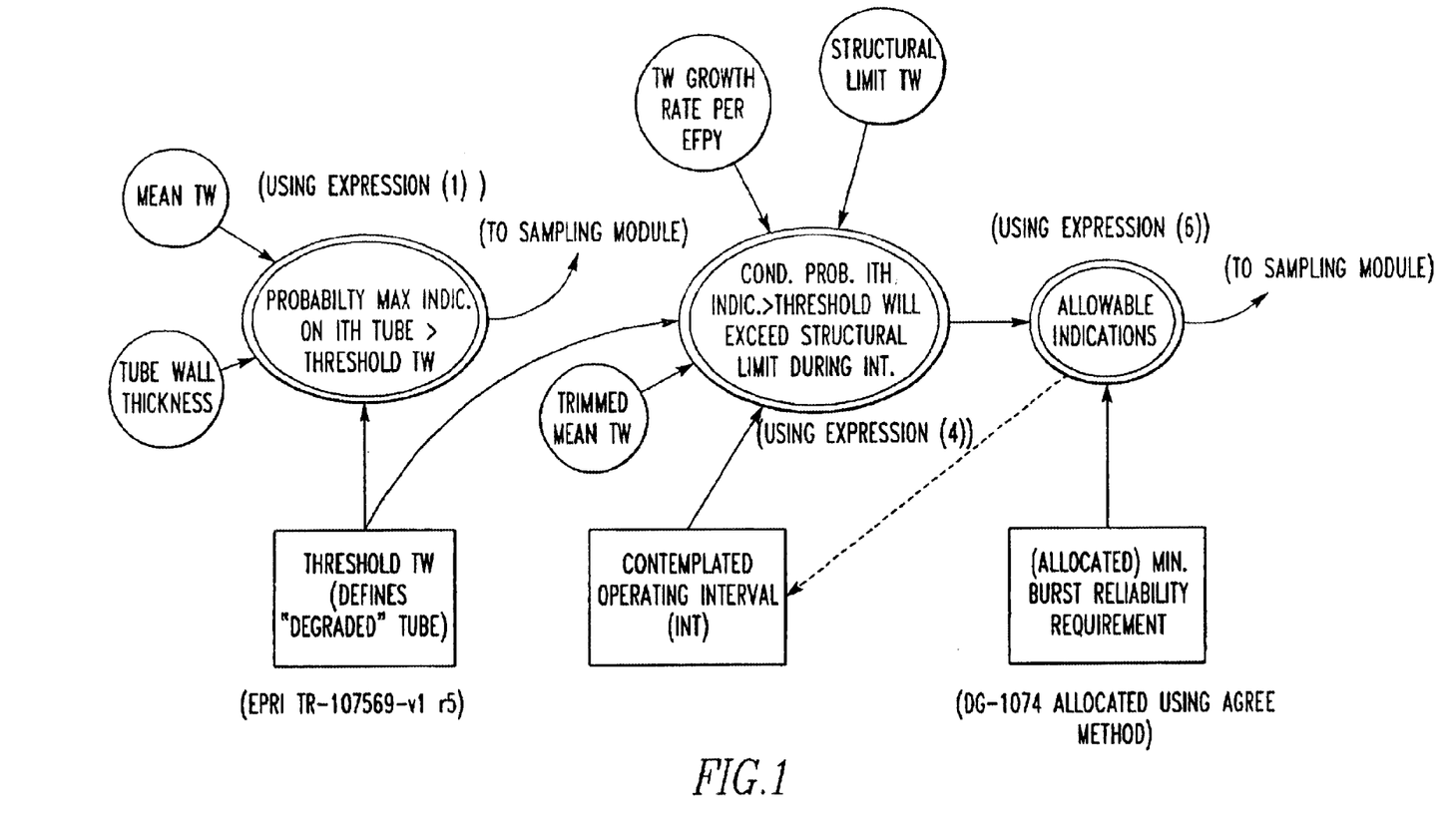
FIG. 1 is a flow diagram of the allowable indications module of this invention.

The Allowable Indications Module is illustrated on FIG. 1. This module can be used to determine either:

(a) the indications that may safely be left in service for a specified number of "effective full power years" (EFPY) of operation (tubes with some form of wear, corrosion or other specified form of degradation that has not reached a repairable stage), or, (b) the maximum number of EFPY between tube inspections consistent with the number of degraded tubes left at the last inspection.

The algorithms in the module are derived from an adaptation of the extreme value probability distribution theory. Where reference is made to "indications", in cases where a tube might have more than one indication of degradation, the term is meant to refer to the degradation in the stage of growth that has the highest percentage of through-wall penetration.

Specifically, $h_i$ is defined to be the initial maximum depth ("throughwall") indication in the $i^{th}$ tube caused by a non-specific degradation phenomenon (e.g., wear, corrosion, etc.) at any arbitrary instant in time. Adapting a standard textbook approach, (for example, reference is made to page 44 of Kapur, K. C., and L. R. Lamberson, Reliability in Engineering Design, John Wiley & Sons, 1977) to steam generator tubes, we assume $h_i$ represents a random sample from a truncated exponential probability distribution; i.e., for any individual tube, $$P(h_i \geq h) = \frac{e^{\frac{-h}{\theta}} - e^{\frac{-H}{\theta}}}{1 - e^{\frac{-H}{\theta}}}, (0 \leq h \leq H) \quad (1)$$

where:

$\theta$=a parameter whose value is the mean indication depth, h=some specified relative depth value (i.e., the actual depth divided by the thickness of the tube), and, H=a structurally limiting relative depth.

A "failure" occurs when the structurally limiting depth is exceeded. The left-hand side of expression (1) is read as "the probability that any maximum depth indication, i.e., any tube, will meet or exceed a user-specified value of h, as explained hereafter.

Next, adopt the standard assumption that the indication growth rate is constant for a specified degradation phenomenon so that the time-to-failure for the $i^{th}$ tube, $t_i$, is proportional to the distance between the structural limit and indication depth, $$t_i = \frac{1}{g}(H - h_i), \quad (2)$$

where g is a constant indication growth rate per unit time whose value is to be estimated. Solving (2) for $h_i$, substituting the result into (1) and then rearranging yields $$G(t) = P(t_i \leq t) = P(h_i \geq H - gt) = \frac{e^{\frac{gt}{\theta}} - 1}{e^{\frac{H}{\theta}} - 1}, \quad (3)$$

Expression (3) is the distribution on the time to failure of the $i^{th}$ tube from a set consisting of η such tubes (or inspection points). Failure of the lot is determined by the first tube to fail or, equivalently, if σ is the time to failure for the sample, then σ=the minimum of ($t_i$, i=1, 2, ... η). In this example, the lot refers to the entire number of tubes in a single steam generator. Utilizing the cumulative distribution for the first-order statistic of a sample of size η (e.g., see page 352 of Bain, L. J., Statistical Analysis of Reliability and Life Testing Models, Marcel Dekker, Inc. 1978), $$P(\tau \leq t) = 1 - [1 - G(t)]^\eta \quad (4)$$

Expression (4) is an extreme value distribution expressing the probability that a tube in the set defined as degraded will fail before some user-specified time t. The "Reliability", R, which is the probability of not failing before t, is defined as 1 minus the probability of expression (4), i.e., $$R = [1 - G(t)]^\eta \quad (5)$$

Referring again to FIG. 1, the object of this module is to calculate the maximum number of tubes with indications exceeding the threshold (but obviously not exceeding the structural limit) that may be left in the steam generator for a user-specified time interval stretching to t and given a regulatory requirement that R be no less than some value R*. This is accomplished by solving (5) for the sample size η* that yields the desired reliability R*, $$\eta^* = \text{Allowable Number of Degraded Tubes} = \ln(R^*)/\ln[1-G(t)], \quad (6)$$

Now that the module is defined, the next step is to provide estimators for its parameters. The approach is tailored to use the same information currently collected or available from industry published sources. From the most recent condition monitoring analysis, one can estimate a value for the exponential parameter in expression (1):

$$\hat{\theta} = \frac{1}{n}\sum_i h_i, \quad (0 \leq h \leq H) \quad (7)$$

where n=sample size. Under the usual assumptions regarding randomness of the sample, this is a maximum likelihood estimator of the population counterpart. In estimating (7), the user can make a standard correction for non-perfect detection; i.e., divide the h by a probability of detection. Two or more sequential operation assessment samples are required to estimate the value of g, the constant growth rate in expression (2). Let y=the effective full power years between the two samples, and $g_i$=the growth in relative depth of the $i^{th}$ tube's maximum indication over that interval. Then an estimator of g is $$\hat{g} = \frac{1}{n}\sum_i \frac{g_i}{y} \quad (8)$$

Finally, the desired reliability in expression (6) must be consistent with a plant-wide target. DG-1074, U.S. Nuclear Regulatory Commission, "Steam Generator Tube Integrity (Draft Guide)", December 1998, assigns a minimum burst probability of $10^{-2}$ for any one mode of degradation for the whole plant, which typically consists of more than one steam generator. This invention allocates this $10^{-2}$ tube burst target to any specific steam generator or lot within a steam generator by using the well-known AGREE method (see page 409 of Kapur, K. C., and L. R. Lamberson, Reliability in Engineering Design, John Wiley & Sons, 1977) which, in this case, reduces to apportioning the following to the jth lot or steam generator, $$R_j^* = (1 - 0.01)^{\frac{N_j}{N}}, \quad (9)$$

where $N_j$ is the number of tubes (or, if relevant, inspection points) in the $j^{th}$ lot or steam generator of interest and N is the total number of such tubes or inspection points across all steam generators in the plant. All other parameters in this module are known constants.

Current practice, particularly as applied to wear degradation, is essentially ad hoc. For example, in calculating the time to failure over a specified interval, one recommended method for cracked tubes simply applies an average historical crack growth rate to the deepest indication found in the last inspection sample, (EPRI TR-107621-R1, Electric Power Research Institute, "Steam Generator Integrity Assessment Guidelines: Revision 1", March 2000, p. A7). This is equivalent to assuming that the favorite horse always wins the race. The approach of this invention, by contrast, recognizes some tubes are more likely than others to "win" the race but nevertheless assigns some probability to each tube of being the first to fail. The Allowable Indications Module of the subject invention interprets and combines known statistical-probabilistic algorithms to produce a novel solution to the problem of providing a rigorous risk-based determination of the number of degraded tubes that may be left in a steam generator for a specified time interval, i.e., until the next inspection, while still satisfying regulatory guidelines on the probability of a tube burst. Equally important, the model can, by trial and error or "goal seek," provide the maximum time to next inspection for a known number of degraded tubes, e.g., from a recently-completed inspection, that will meet the aforementioned regulatory burst probability. Analytical rigor is particularly important in that any approval to reduce inspections must gain the approval and withstand the scrutiny of an exhaustive regulatory review process.

Sampling Module

Figure 2:
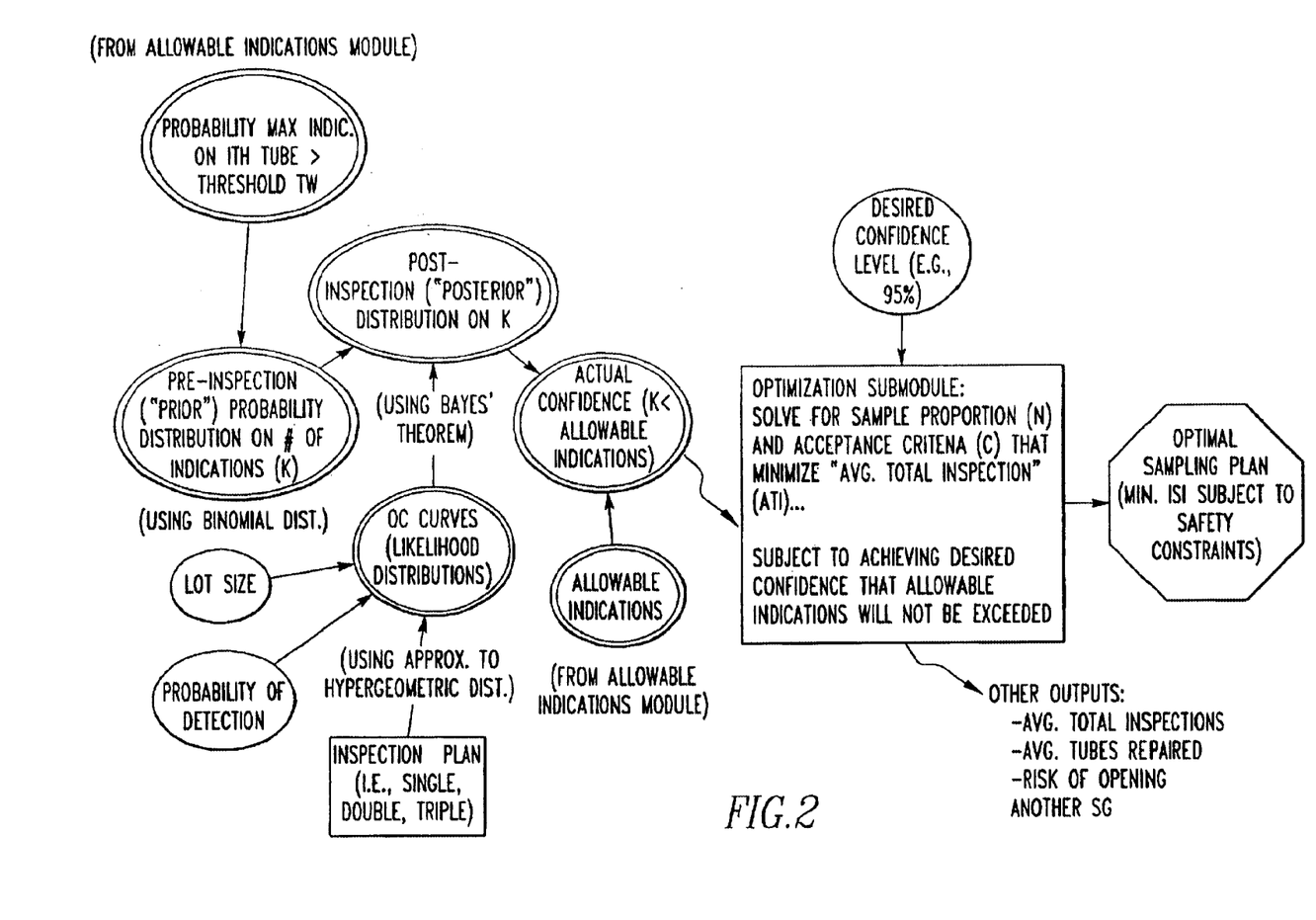
FIG. 2 is a flow diagram of the sampling module of this invention.

The Sampling Module of this innovation is illustrated on FIG. 2. This module takes the allowable number of degraded tubes as a given and proceeds to determine the minimum expected number of inspected tubes required to assure with some specified confidence, e.g., 95%, that the steam generator will not be put back into service with an unacceptable number of degraded tubes. We follow industry convention and define a "degraded" tube as one whose maximum indication, e.g., wear, pit, etc., depth exceeds some agreed-upon "threshold" relative throughwall value, $h_0$, expressed as a ratio to the wall thickness. It is important to note that this is a threshold for significance and not a threshold for detection. The threshold is determined through engineering analysis to be that depth where a tube with a maximum indication below $h_0$ has no credible likelihood of bursting.

A typical plant will have either 2, 3 or 4 steam generators and typically the inspection plan will call for only 1 or 2 to be inspected during any given planned plant outage. This analysis, while couched in terms of one steam generator, incorporates the probability that if an excessive number of degraded tubes are found in one steam generator, then another steam generator (or all) not scheduled for inspection may have to be opened. The approach uses a novel twist on classical acceptance sampling in that the classical "operating characteristic" curve is treated as a likelihood function and is combined via Bayes' Theorem with prior information obtainable from Equation (1) in the Allowable Indications Module. Specifically, the probability that a randomly selected tube in the $j^{th}$ homogeneous lot of $N_J$ tubes is degraded can be calculated from expression (1) as $$p = P(h_o > h_i > H), \tag{10}$$

Denote the actual but unknown number of degraded tubes in the lot as K, which may be any integer value from zero up to $N_J$. Prior to inspection in the current outage, the probability distribution on K is a binomial distribution with parameters p and $N_J$ and denoted by $$b(K:p, N_J), \tag{11}$$

Now define an acceptance sampling plan denoted by $$S(n, c_L, c_U), \tag{12}$$

where n=sample size as a proportion of $N_J$, $c_L$=the lower acceptance criterion as a proportion of cumulative sample size and, $c_U$=the upper acceptance criterion, also defined as a proportion of the cumulative sample.

In the acceptance sampling literature, e.g., Grant, E. L., and R. S. Leavenworth, Statistical Quality Control, McGraw-Hill, 1988, each sampling plan can be defined by an "operating characteristic" (OC) curve, denoted by $O_s$, defining the probability of "accepting" the lot; i.e., $$\text{Pr(Accepting the Lot)} = O_s(A:K, POD), \tag{13}$$

where POD is the probability of detection of an indication, i.e., if a defect shows up in a sample, there is a probability that it will be detected. All other formulations of the OC curve implicitly assume that the POD=1. In this application, it is important to allow for a less-than-perfect ability to detect a degraded tube within a sample.

The OC curve provides the probability that the sampling plan will accept (A) the lot if the lot indeed has K degraded tubes. Letting K take on various values traces out a curve showing the probability of acceptance for various hypothesized numbers of degraded tubes.

The conventional approach to acceptance sampling applied to this problem would be as follows. Let $\eta^*$=the maximum allowable number of degraded tubes as previously defined and assume that the user is willing to accept no more than a probability of $\alpha$ (called "consumer risk") that this maximum will be exceeded or, equivalently, the user desires a confidence of $1-\alpha$ that $\eta^*$ will not be exceeded. Under the conventional approach, the triple sample plan, described earlier in the background section hereof, is acceptable only if the probability of acceptance at $\eta^*$ equals the desired consumer risk, i.e., when $O_s(A:\eta^*)=\alpha$. Actually, any number of plans might have OC curves satisfying the latter equality, so the objective for the user would be to select one with minimum expected sampling. The conventional approach takes no account of prior sampling and consequently makes only a conditional statement ("if a lot with $\eta^*$ is presented, the chance of accepting it is $\alpha$"). This invention takes advantage of information from prior sampling and makes an "unconditional" statement of the form "if this sampling plan is implemented, then the probability of putting a steam generator back in service with more than the maximum allowable degraded tubes is . . . ." Consequently, (expanding on an idea proposed in Perdue, R. K., "A Spreadsheet Model for Evaluation of Statistical Confidence in Nuclear Inservice Inspection Plans," a Westinghouse working paper attached to a letter to Jack Guttmann, USNRC, Feb. 10, 1998), this invention takes the perspective that the OC curve is a "likelihood function" and invokes Bayes' Theorem to calculate $p_s(K:A)$=a post-inspection or "posterior" probability distribution on K, $$p_S(K:A) = \frac{b(K:p, N_j) \cdot O_S(A:K, POD)}{\sum b(K:p, N_j) \cdot O_S(A:K, POD)}. \tag{14}$$

Let the cumulative posterior distribution be denoted by $$P_s(K:A) = \text{cumulative } p_s(K:A) \tag{15}$$

Then, for any sampling plan, we can check to insure that the following constraint is satisfied:

$$P_s(K=\eta^*:A) \geq 1-\alpha \tag{16}$$

That is, the plan must provide at least the stipulated level of confidence, e.g., 95%, that the maximum allowable number of degraded tubes will not be allowed to go back into service. Using and expanding upon formulas in Grant, E. L., and R. S. Leavenworth, Statistical Quality Control, McGraw-Hill, 1988, the "Average Total Inspection" (ATI= the mathematical expectation of the number of tubes that will be inspected) for each sample plan can be calculated as a function of the sample proportion, n, the lot size $N_J$, and probabilities that are calculated as a by-product of constructing the OC Curve (described hereafter). The mathematical optimization problem may be stated as:

$$\text{Minimize Average Total Inspection (ATI)}=$$
$$f(n, N_J, O_s(A:K, POD)), \tag{17}$$

by manipulation of sample proportion n, and lower and upper criterion $c_L$ and $c_u$ within a user-specified single, double or triple sample plan, subject to the constraint imposed by expression (16).

In general, the optimal combination of sample proportion and criterion within a specified type of plan, e.g., single, double, or triple, is a tradeoff between increased planned inspection, e.g., n $N_J$ in a single sample, and the risk of 100% sampling of the already-opened steam generator plus the opening of another steam generator. The problem is non-linear but can be solved by commercially-available mathematical optimization programs that have non-linear routines or by genetic algorithm approaches. The optimization problem can be set up in Microsoft Excel® and a commercially-available mathematical optimization "solver" from Frontier Systems that "adds-in" to the spreadsheet software can be used to obtain a solution.

In the current software implementation, the model is evaluated for values of K ranging from 0 to 2200 degraded tubes. For each value of K, there is a corresponding point on the OC curve that is calculated by a set of algorithms illustrated in FIG. 3 by a "decision tree." The tree is drawn for a triple plan virtually identical to that recommended by the aforementioned EPRI guideline.

Figure 3:
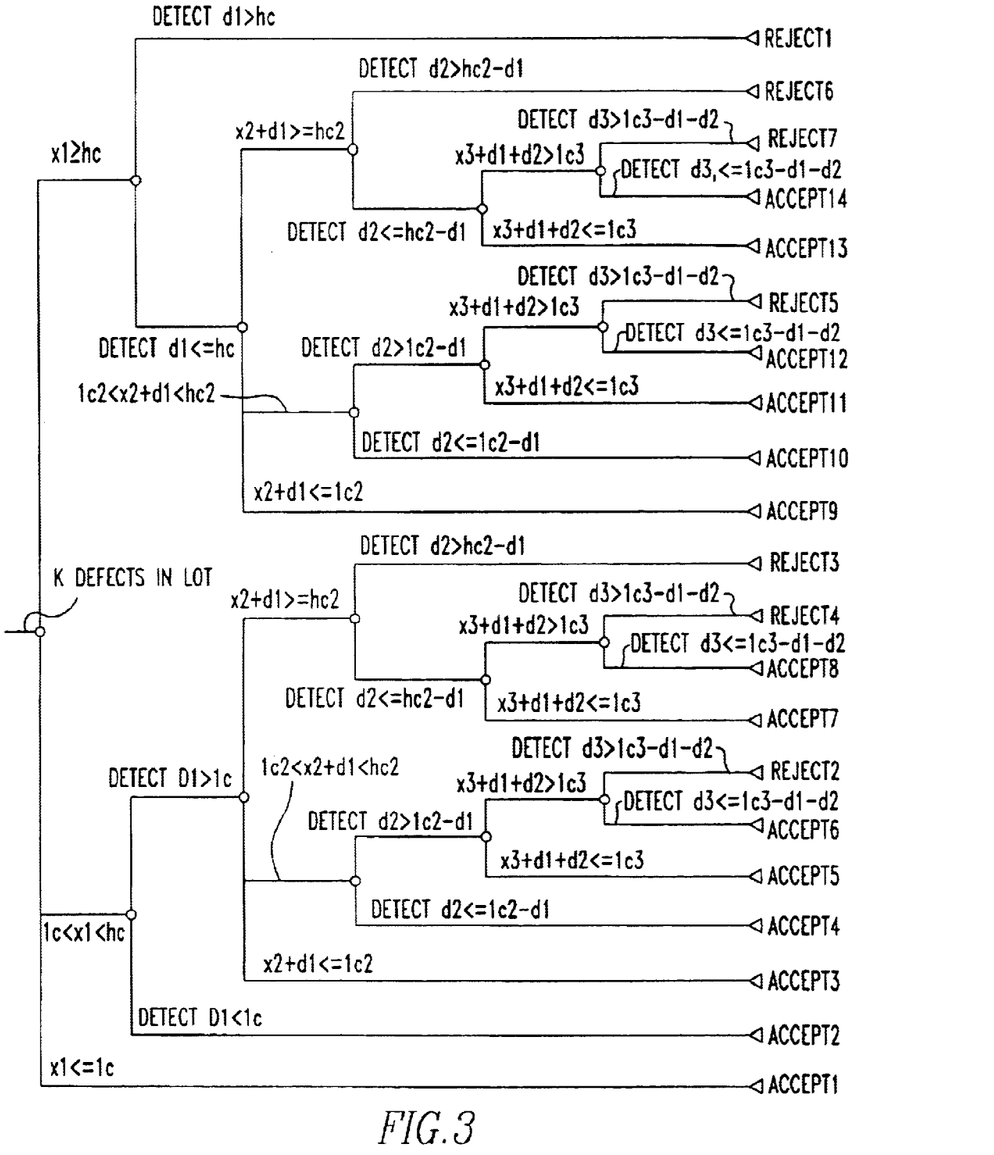
FIG. 3 is a decision tree for calculating operating characteristic curves employed by the method of this invention.

Let "x1" designate the number of defects that exist in the first sample, but also note that these are not necessarily detected. There are three initial possibilities as illustrated on the left side of FIG. 3. Each of these are discussed in what follows. For the hypothesized $k^{th}$ value of "defects" in the lot, the first sample of $n \cdot N_J$ may have $x1 \geq hc = c_U \cdot n \cdot N_J$ defects, the top path of FIG. 3, with a probability of $$1 - H(hc, n \cdot N_J, K, N_J), \quad (18)$$

where the "H" of the latter term indicates the cumulative hypergeometric distribution with the following parameters:

hc=upper limit on number of defects, $= c_U \cdot n \cdot N_J$ $c_U$=previously-defined upper acceptance criterion (a proportion), $n \cdot N_J$=sample size (n=sample size as a proportion to lot size), K=number of defects in the lot, and $N_J$=the lot size.

Alternatively, x1 may fall between upper, hc, and lower, lc $(= c_L \cdot n \cdot N_J)$, criteria values, i.e., lc<x1<hc, the middle path on FIG. 3. The probability of this event is $$H(hc, n \cdot N_J, K, N_J) - H(lc, n \cdot N_J, K, N_J), \quad (19)$$

Lastly, x1 may be equal to or less than the lower limit, the lower path on FIG. 3, with a probability of H(lc, n·Nj, K, $N_J$).

The subsequent action to be taken depends on what is actually detected. We assume no false positives because they are not a safety concern and because inclusion would substantially complicate calculations.

1. If $x1 \leq lc$, i.e., is less than or equal to the lower limit, then the sampling will stop as per the decision rules outlined for the EPRI triple plan described above. Equivalently, the lot will be "Accepted" without further sampling and this is denoted by "Accept1" at the corresponding tip of the tree, i.e., the bottom path.

2. If the actual number of defects in the first sample falls between the lower and upper criterion, and the inspectors actually "Detect d1>lc", then a second sample is taken and the process just described is repeated.

3. If, conversely, the inspectors actually "Detect d1<lc" then the outcome is "Accept2."

The probability of detecting lc or larger defects in a sample containing x1 (>lc) defects is calculated from the cumulative binomial with parameters x1, i.e., the number of defects in the sample to be found, and POD, i.e., the probability that any one defect, if it turns up in a sample, will be detected.

From the foregoing, one "knows" only that x1 is in the range lc to hc and can assume each outcome in that range is equally possible and take the average value in that range as an estimate of x1 for this calculation. The probability of detection for various modes of degradation is a much-studied parameter and is readily available. The probability of "Detect d1>lc" is simply 1 minus the probability of "Detect d1≤lc", where d1 is the number of defects detected in the second sample.

Calculations of probabilities at other nodes in FIG. 3 follow a similar pattern so that the tree is filled out with a probability at each node. Every path through the tree leads to either an "Accept" or a "Reject" (=inspect 100% of this lot and open another steam generator not previously scheduled for inspection and repeat the sampling plan). The probability of following any particular path to any particular outcome is a product of the probabilities along that path (i.e., at each node along that path). The probability of acceptance for the K=k number of defects=$O_s$(A:K=k, POD)=the sum of all path probabilities leading to an "Accept" decision. The whole process described in this section is repeated for each value of K.

While theoretically correct, the cumulative hypergeometric distribution contains factorials that become untenably large for the lot, sample and defect sizes contemplated in this application. Consequently, the first term of Wise's Approximation is used in place of the cumulative hypergeometric distribution, see Lieberman, G. J. and D. B. Owen, Tables of the Hypergeometric Probability Distribution, Stanford University Press, 1961, page 19.

Figure 4:
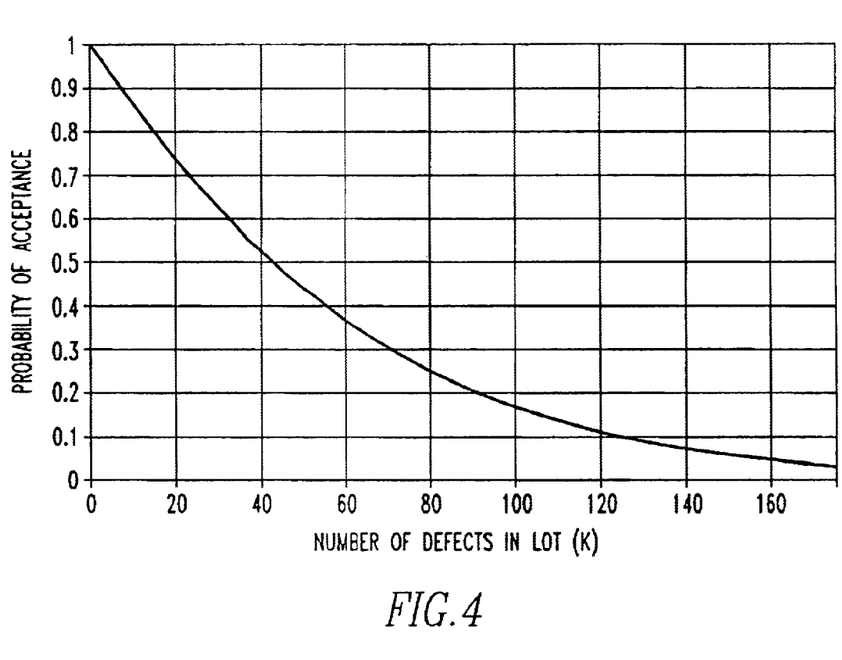
FIG. 4 is an exemplary operating characteristic curve calculated in accordance with this invention.

The single and double plan OC curves are derived from the summation of appropriate path probabilities. Referring to FIG. 3, the single plan OC curve is the sum of Accept paths 1 and 2 while the double plan OC curve is the sum of Accept paths 1, 2, 3, 4, 9 and 10. Similarly, the probability of accepting after the first, second or third sample can be calculated by appropriate summation of path probabilities and the resulting probability is then used to calculate the Average Total Inspection (ATI) variable described earlier. For example, the probability of accepting after one sample is $PA_1$ which equals the sum of accept paths Accept1 and Accept2, and the single sample ATI is equal to:

$$nN_J \cdot PA_1 + N_J(1-PA_1) + \{(1-PA_1)[nN_J \cdot PA_1 + N_J(1-PA_1)]\}, \quad (20)$$

where the term in braces denotes the expected number of tubes inspected if a second steam generator must be opened. Similar expressions are derived for the double and triple plan ATI. A sample OC curve is illustrated in FIG. 4 for a double plan, N=2333, n1=n2=57, lc=0, hc=23 and POD=60%.

Finally, the "Risk" of each plan is here defined to be the probability of having to do 100% sampling (and, by implication, opening up another steam generator) and this is calculated as the probability of rejection, which equals the sum of all paths leading to "Reject" in the decision tree.

This invention provides the only model to date to explicitly link the mathematical minimization of expected sampling to Nuclear Regulatory Guidelines on the maximum allowable plant-wide tube burst rate. No other published scheme provides the plant with comparable flexibility in the choice or design of a sampling plan. The minimization is afforded by the realization that minimizing sampling costs subject to regulatory constraints can be formulated as a non-linear optimization problem. The rigorous connection between sample plan and regulatory guidelines is afforded by an innovative use of Bayes' Theorem, which also provides added flexibility in the choice of a sampling plan that fits any particular plant's historical experience.

The concept embodied in expression (14) has been previously discussed in a Nuclear Regulatory Commission document in connection with risk-informed inspection of nuclear plant piping, NUREG-1661, U. S. Nuclear Regulatory Commission, "Technical Elements of Risk Informed Inservice Inspection Programs for Piping," January 1999. In this model, however, the binomial probability of a degraded tube and the allowable number of defects are explicitly and more rigorously derived by the same process. Specifically, the binomial probability previously had to be assigned by the user (based on analytical work outside the model) rather than being calculated as part of the process of defining the maximum allowable defects and the latter were simply deduced from a generic leak rate that had historically been observed as opposed to the present method of deriving it from an extreme value model and a stipulated regulatory guideline.

The nomenclature employed in the foregoing expressions are tabularized below for convenience:

| Nomenclature | |
|---|---|
| A | Accept. |
| ATI | The mathematical expectation of the number of tubes that will be inspected. |
| $c_l$ | Lower acceptance criterion, portion of cumulative sample size. |
| $c_u$ | Upper acceptance criterion, portion of cumulative sample size. |
| F | Designated function. |
| G | Designator of cumulative probability. |
| h | A specified maximum relative depth value. |
| $h_I$ | The initial maximum relative depth of the deepest indication in the $i^{th}$ tube. |
| $h_0$ | A threshold relative depth value below which the probability of burst is negligible; defines a "degraded" tube. |
| H | A structurally limiting maximum relative depth value. |
| i | Index designating one element of a sample. |
| K | Unknown number of degraded tubes. |
| n | Sample size. |
| N | Total number of tubes or inspection points. |
| $N_j$ | Number of tubes or inspection points of the $j^{th}$ lot. |
| $O_s$ | Operating characteristic curve. |
| p | Probability. |
| P | Designated probability or cumulative probability distribution. |
| POD | Probability of detection. |
| R | Reliability, the probability of survival, i.e., not failing before time t. |
| R* | Desired or required value of R. |
| S | Sampling plan. |
| $t_I$ | The time-to-failure for the $i^{th}$ tube. |
| t | Time in specified units. |
| y | Effective full power years between inspection samples. |
| α | "Consumer risk" (probability) that the maximum allowable number of indications will be exceeded. |
| g | Constant growth rate of degradation. |
| ĝ | Estimate of parameter g |
| η | Parameter of the extreme value distribution (the number of tubes in the set defined as "degraded"). |
| η* | Allowable number of degraded tubes. |
| τ | Minimum time-to-failure of a sample of size η |
| θ | Parameter of the truncated exponential distribution. |
| θ̂ | Estimate of parameter θ. The mean of the maximum relative depths across $N_j$ |

FIG. 3 Specific Nomenclature

| | |
|---|---|
| d1 | Number of degraded tubes detected in the first sample. |
| d2 | Cumulative number of degraded tubes detected in the $1^{st}$ and $2^{nd}$ samples. |
| d3 | Cumulative number of degraded tubes detected in the $1^{st}$, $2^{nd}$ and $3^{rd}$ samples. |
| hc | Upper bound on cumulative degraded tubes found above which the lot is rejected. |
| lc | Lower bound on cumulative degraded tubes found below which the lot is accepted. |
| x1 | Number of degraded tubes in the first sample. |
| x2 | Number of degraded tubes in the second sample. |
| x3 | Number of degraded tubes in the third sample. |

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A probabilistic method of optimizing the inspection of a heat exchanger comprising the steps of:

Inspecting a number of tubes in a tube bundle of the heat exchanger for indications of degradation;

Determining the maximum number of degraded tubes, based upon extreme value probability distribution theory, that can be permitted to remain in service for a contemplated interval of time without exceeding an allowable probability of a tube burst Determining the minimum number of tubes that need to be inspected to establish that no more than the determined maximum number of degraded tubes will be permitted to remain in service for the contemplated interval of time based upon Bayesian acceptance sampling theory.

2. The method of claim 1 wherein the permitted maximum number of degraded tubes and the maximum time between inspections are determined by the approach embodied in the following expressions (1) through (6)

$$P(h_i \geq h) = \frac{e^{-\frac{h}{\theta}} - e^{-\frac{H}{\theta}}}{1 - e^{-\frac{H}{\theta}}}, (0 \leq h \leq H) \tag{1}$$

where:

θ=a parameter whose value is the mean indication depth, h=some specified relative depth value (i.e., the actual depth divided by the thickness of the tube), $h_i$=represents a random for any individual tube, and, H=a structurally limiting relative depth.

$$t_i = \frac{1}{g}(H - h_i), \tag{2}$$

where:

$t_i$=time-to-failure for the $i^{th}$ tube, g=a constant indication growth rate per unit time whose value is to be estimated, $$G(t) = P(t_i \leq t) = P(h_i \geq H - gt) = \frac{e^{\frac{gt}{\theta}} - 1}{e^{\frac{H}{\theta}} - 1}, \tag{3}$$

where:

Expression (3) is the distribution on the time to failure of the $i^{th}$ tube from a set consisting of η such tubes (or inspection points)

$$P(\tau \leq t) = 1 - [1 - G(t)]^\eta, \tag{4}$$

where:

τ is the time to failure for the sample, then τ=the minimum of ($t_i$, i=1, 2, ... η), $$R = [1 - G(t)]^\eta \tag{5}$$

where:

R="Reliability", which is the probability of not failing before t, is defined as 1 minus the probability of expression (4), and $\eta^*$=Allowable Number of Degraded Tubes=$\ln(R^*)/\ln[1-G(t)]$, (6)

where:

R*=The desired Reliability, and $\eta^*$=The sample size that yields the desired reliability R*.

3. The method of claim 1 wherein the minimum expected number of inspected tubes required to assure, with some specified confidence, that the heat exchanger will not be put back into service with an unacceptable number of degraded tubes is determined by the approach embodied in the following expressions (10) through (20):

$$p=P(h_0, \pi h, \pi H), \quad (10)$$

where:

p=the probability that a randomly selected tube in the $j^{th}$ homogeneous lot of $N_J$ tubes is degraded, $$b(K:p,N_J), \quad (11)$$

where:

b=the probability distribution on K

K=The actual but unknown number of degraded tubes in the lot, $$S(n,c_L,c_U), \quad (12)$$

where:

S=An acceptance sampling plan, n=sample size as a proportion of $N_J$, $c_L$=the lower acceptance criterion as a proportion of cumulative sample size and, $c_U$=the upper acceptance criterion, also defined as a proportion of the cumulative sample, $$\Pr(\text{Accepting the Lot})=O_s(A:K,POD), \quad (13)$$

where:

Pr=The probability of "accepting" the lot,

POD=The probability of detection of a defect, and $O_s$=The operating characteristic, $$p_S(K:A) = \frac{b(K:p, N_j) \cdot O_S(A:K, POD)}{\sum b(K:p, N_j) \cdot O_S(A:K, POD)} \quad (14)$$

where:

A=The probability that the sampling plan will accept the lot if the lot indeed has K degraded tubes, $$P_s(K:A)=\text{cumulative } p_s(K:A), \quad (15)$$

$$P_s(K=\eta^*:A) \geq 1-\alpha, \quad (16)$$

where:

$\alpha$=probability that the maximum allowable number of indications will be exceeded, Minimize Average Total Inspection (ATI)=$f(n,N_J,O_s(A:K,POD))$, (17)

where:

n=the sample proportion, $$1-H(hc, n \cdot N_J, K, N_J),$$

where:

H=the cumulative hypergeometric distribution with the following parameters:

hc=upper limit on number of defects, =$c_U \cdot n \cdot N_J$, $c_U$=previously-defined upper acceptance criterion (a proportion), $n \cdot N_J$=sample size (n=sample size as a proportion to lot size), K=number of defects in the lot, and $N_J$=the lot size, The probability of falling between upper and lower criteria=
$H(hc, n \cdot N_J, K, N_J) - H(lc, n \cdot N_J, K, N_J),$  (19)

where:

lc=lower limit on number of defects, =$c_L \cdot N_J$, $$ATI=nN_J \cdot PA_1 + N_J(1-PA_1) + \{(1-PA_1)[n \ N_J \cdot PA_1 + N_J(1-PA_1)]\}, \quad (20)$$

where:

$PA_1$=The probability of accepting after one sample,

ATI=The average total Inspection variable.

4. The method of claim 1 including the step of calculating a probability that a tube in a set defined as degraded will equal or exceed a structurally limiting relative depth before the expiration of the contemplated interval of time, using an extreme value model of the minimum time to failure.

5. The method of claim 1 wherein the determining step takes into account the probability of detection of a given one of the degraded tubes.

6. The method of claim 1 wherein the contemplated interval of time is a variable selected to minimize the frequency of inspection of the heat exchanger.

7. A method for optimizing the inspection of a heat exchanger, comprising the steps of:

Inspecting a number of tubes in a tube bundle of the heat exchanger for indications of degradation; and Determining the maximum time of service between tube inspections the heat exchanger can operate consistent with the number of degraded tubes left unrepaired at a last inspection, wherein the Determining step derives the time of service between tube inspections from a probabilistic algorithm.

8. The method of claim 7 wherein the probabilistic algorithm is based upon the extreme value probability distribution theory.

9. A probabilistic method of optimizing the inspection of a set of a plurality of pressure barriers in a primary system of a nuclear power plant comprising the steps of:

Inspecting a number of pressure barriers in the set of pressure barriers for indications of degradation;

Determining the maximum number of degraded pressure barriers, based upon extreme value probability distribution theory, that can be permitted to remain in service for a contemplated interval of time without exceeding an allowable probability of a pressure barrier failure; and Determining the minimum number of pressure barriers that need to be inspected to establish that no more than the determined maximum number of degraded pressure barriers will be permitted to remain in service for the contemplated interval of time based upon Bayesian acceptance sampling theory.

10. The method of claim 9 wherein the permitted maximum number of degraded pressure barriers and the maximum time between inspections are determined by the approach embodied in the following expressions (1) through (6)

$$P(h_i \geq h) = \frac{e^{\frac{-h}{\theta}} - e^{\frac{-H}{\theta}}}{1 - e^{\frac{-H}{\theta}}}, (0 \leq h \leq H) \quad (1)$$

where:

$\theta$=a parameter whose value is the mean indication depth, h=some specified relative depth value (i.e., the actual depth divided by the thickness of the pressure barrier), $h_i$=represents a random for any individual pressure barrier, and, H=a structurally limiting relative depth, $$t_i = \frac{1}{g}(H - h_i), \quad (2)$$

where:

$t_i$=time-to-failure for the $i^{th}$ pressure barrier, g=a constant indication growth rate per unit time whose value is to be estimated, $$G(t) = P(t_i \leq t) = P(h_i \geq H - gt) = \frac{e^{\frac{gt}{\theta}} - 1}{e^{\frac{H}{\theta}} - 1}, \quad (3)$$

where:

Expression (3) is a distribution on a time to failure of the $i^{th}$ pressure barrier from a set consisting of $\eta$ such pressure barriers (or inspection points)

$$P(\tau \leq t) = 1 - [1 - G(t)]^\eta, \quad (4)$$

where:

$\tau$ is the time to failure for a sample, then $\tau$=the minimum of ($t_i$, i=1, 2, $\eta$), $$R = [1 - G(t)]^\eta \quad (5)$$

where:

R="Reliability", which is a probability of not failing before t, is defined as 1 minus the probability of expression (4), and $\eta^*$=Allowable Number of Degraded Pressure barriers=ln(R*)/ln [1−G(t)], (6)

where:

R*=The desired Reliability, and n*=The sample size that yields the desired reliability R*.

11. The method of claim 9 wherein the minimum expected number of inspected pressure barriers required to assure, with some specified confidence, that the nuclear power plant will not be put back into service with an unacceptable number of degraded pressure barriers is determined by the approach embodied in the following expressions (10) through (20):

$$p = P(h_\sigma, \pi h, \pi H), \quad (10)$$

where:

p=a probability that a randomly selected pressure barrier in a $j^{th}$ homogeneous lot of $N_J$ pressure barriers is degraded, $$b(K:p, N_J), \quad (11)$$

where:

b=a probability distribution on K

K=An actual but unknown number of degraded pressure barriers in the set, $$S(n, c_L, c_U), \quad (12)$$

where:

S=An acceptance sampling plan, n=sample size as a proportion of $N_J$, $c_L$=a lower acceptance criterion as a proportion of cumulative sample size and, $c_U$=an upper acceptance criterion, also defined as a proportion of the cumulative sample, $$\text{Pr}(\text{Accepting the Lot}) = O_s(A:K, POD), \quad (13)$$

where:

Pr=a probability of "accepting" the set,

POD=a probability of detection of a defect, and $O_s$=an operating characteristic, $$p_S(K:A) = \frac{b(K:p, N_j) \cdot O_S(A:K, POD)}{\sum b(K:p, N_j) \cdot O_S(A:K, POD)} \quad (14)$$

where:

A=a probability that the sampling plan will accept the set if the set indeed has K degraded pressure barriers, $$P_s(K:A) = \text{cumulative } p_s(K:A), \quad (15)$$

$$P_s(K = \eta^*:A) \geq 1 - \alpha, \quad (16)$$

where:

$\alpha$=probability that the maximum allowable number of indications will be exceeded, Minimize Average Total Inspection (ATI)=f(n,$N_J$,$O_s$(A:K,POD)) (17)

where:

n=a sample proportion, $$1 - H(hc, n \cdot N_J, K, N_J), \quad (18)$$

where:

H=a cumulative hypergeometric distribution with the following parameters:

hc=upper limit on number of defects, =$c_U \cdot n \cdot N_J$ $c_U$=previously-defined upper acceptance criterion (a proportion), n·$N_J$=sample size (n=sample size as a proportion to set size), K=number of defects in the set, and $N_J$=the set size, a probability of falling between upper and lower criteria=$H(hc, n \cdot N_J, K, N_J) - H(lc, n \cdot N_J, K, N_J)$, (19)

where:

lc=lower limit on number of defects, =$c_L \cdot n \cdot N_J$, $$ATI = n \, N_J \cdot PA_1 + N_J(1 - PA_1) + \{(1 - PA_1)[n \, N_{J \cdot PA \, 1} + N_J(1 - PA_1)]\}, \quad (20)$$

where:

$PA_1$=a probability of accepting after one sample,

ATI=An average total Inspection variable.

12. The method of claim 9 including the step of calculating a probability that a pressure barrier in a set defined as degraded will equal or exceed a structurally limiting relative depth before the expiration of the contemplated interval of time, using an extreme value model of the minimum time to failure.

13. The method of claim 9 wherein the determining step takes into account the probability of detection of a given one of the degraded pressure barriers.

14. The method of claim 9 wherein the contemplated interval of time is a variable selected to minimize the frequency of inspection of the nuclear power plant.

15. A method for optimizing the inspection of a set of a plurality of pressure barriers in a primary system of a nuclear power plant, comprising the steps of:

Inspecting a number of pressure barriers in the set of pressure barriers for indications of degradation; and Determining the maximum time of service between pressure barrier inspections the nuclear power plant can operate consistent with the number of degraded pressure barriers left unrepaired at a last inspection, wherein the Determining step derives the time of service between pressure barrier inspections from a probabilistic algorithm.

16. The method of claim 15 wherein the probabilistic algorithm is based upon the extreme value probability distribution theory.

* * * * *